United States Patent Office 3,555,013
Patented Jan. 12, 1971

3,555,013
PROCEDURE FOR PREPARING 1,4-BENZODI-AZEPINE-2-ONE DERIVATIVES
Hisao Yamamoto, Nishinomiya-shi, Shigeho Inaba, Takarazuka-shi, Tadashi Okamoto, Ashiya-shi, Toshiyuki Hirohashi, Kobe, Kikuo Ishizumi, Minoo-shi, Michihiro Yamamoto, Takarazuka-shi, Isamu Maruyama, Minoo-shi, Kazuo Mori, Kobe, Tsuyoshi Kobayashi, Minoo-shi, and Takahiro Izumi, Takarazuka-shi, Japan, assignors to Sumitomo Chemical Company, Ltd., Osaka, Japan, a corporation of Japan
No Drawing. Filed Apr. 14, 1969, Ser. No. 816,091
Claims priority, application Japan, Apr. 16, 1968,
43/25,673
Int. Cl. C07d 53/06
U.S. Cl. 260—239.3       5 Claims

ABSTRACT OF THE DISCLOSURE 1,4-benzodiazepine-2-one derivatives represented by the formula,

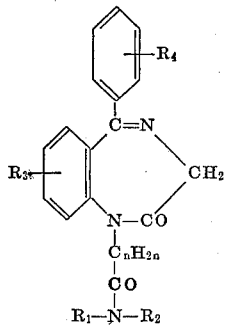

wherein $R_1$ and $R_2$ signify respectively a hydrogen atom or a lower alkyl group; $R_3$ and $R_4$ signify respectively a hydrogen atom, a halogen atom, a nitro group, a lower alkyl group or a halogenated lower alkyl group; and $n$ signifies 1, 2 or 3, and being effective as tranquillizers, muscle-relaxants and hypnotics, are produced by reacting with an oxidizing agent a 2-aminomethyl indole derivative, or a salt thereof, represented by the formula,

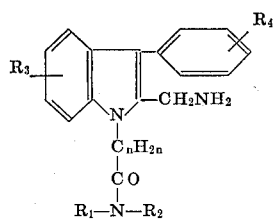

wherein $R_1$, $R_2$, $R_3$, $R_4$ and $n$ are as defined above.

---

This invention relates to a method for producing benzodiazepine derivatives and salts thereof, represented by the Formula I,

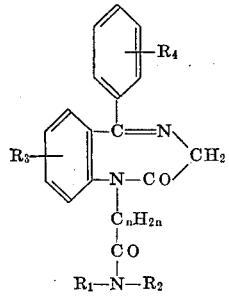

wherein $R_1$ and $R_2$ signify respectively a hydrogen atom or a lower alkyl group; $R_3$ and $R_4$ signify respectively a hydrogen atom, a halogen atom, a nitro group, a lower alkyl group or a halogenated lower alkyl group; and $n$ signifies 1, 2 or 3.

In the compound represented by the aforesaid Formula I, the halogen atom includes chlorine, bromine, iodine and fluorine atoms; the lower alkyl group includes an alkyl group having one to three carbon atoms.

The compounds represented by the Formula I are effective as tranquillizers, muscle-relaxants and hyponotics and are useful for medicines.

The present invention relates to a process for preparing benzodiazepine derivatives, and salts, represented by the Formula I by treating with an appropriate oxidizing agent a 2-aminomethyl indole derivative, or a salt thereof, represented by the Formula II.

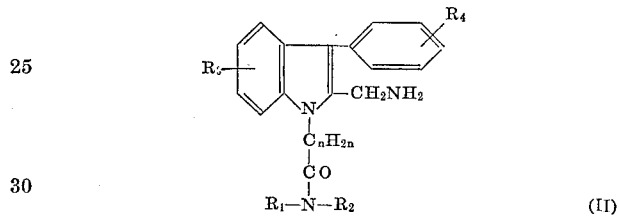

wherein $R_1$, $R_2$, $R_3$, $R_4$ and $n$ are as defined in the above Formula I.

The 2-aminomethyl indole derivative, which is a starting material of the present invention, is prepared by the following process. For instance, 1-alkylcarbamoylalkyl-2-cyano-3-phenyl indole, is obtained by reacting 2-cyano-1-hydroxycarbonylalkyl-3-phenyl indole with alkyl amine or by reacting 2-cyano-3-phenyl indole with alkylcarbamoylalkyl halide, and is converted to 1-alkylcarbamoylalkyl-2-aminomethyl indole with reducing agents.

The thus produced 2-aminomethyl indole derivative can also be used in the form of an acid addition salt of an inorganic acid such as hydrochloric, sulfuric, nitric or phosphoric acid.

The present reaction is a formation of a benzodiazepine ring from an indole ring due to ring expansion, about which nobody has been able to anticipate before the present invention is developed.

A few processes for producing these benzodiazepine derivatives have theretofore been described. For instance, it is known to obtain the benzodiazepine derivatives of the Formula I by synthesizing 1-unsubstituted benzodiazepine and then reacting the compound with sodium methoxide and various carbamoylalkyl halides, such as haloacetamide. (U.S. Pat. 3,236,838.)

Contrary to these procedures, we have found, unexpectedly, that benzodiazepine derivatives of the Formula I can be smoothly and economically prepared by reacting a 2-aminomethyl indole derivative having the Formula II, or its salt, with an appropriate oxidizing agent. The oxidizing agent for this process includes, for example, ozone, hydrogen peroxide, peracetic acid, perbenzoic acid, chromic anhydride and potassium permanganate. This reaction is desirably effected at room temperature. If necessary, however, the reaction may be carried out at lower or higher temperature.

Benzodiazepine derivatives of the Formula I can be isolated as acid salts with mineral acids such as hydrochloric acid, nitric acid and phosphoric acid, or with organic acids such as maleic acid, fumaric acid, succinic acid, formic acid and acetic acid.

The following example is given to illustrate the present invention more particularly.

EXAMPLE

To a suspension of 2.7 g. of 2-aminomethyl-1-(N,N-diethylcarbamoylmethyl)-3-phenyl-5-chloro indole in 30 ml. of acetic acid is added a solution of 2.7 g. of chromic anhydride in 3 ml. of water at 15° C.

The reaction mixture is stirred for 16 hours at room temperature, then is poured into cold ammonia water. A separated product is extracted with carbon tetrachloride and the extract is dried over sodium sulfate.

The solvent is removed under reduced pressure to a residue, which is recrystallized from isopropanol to give 7 - chloro-1-(N,N-diethylcarbamoylmethyl)-5-phenyl-1,3-dihydro-2H-1,4-benzodiazepine-2-one. M.P. 145–147° C.

According to a similar method to that of example, following compounds are obtained.

7-chloro-1-(N,N-dimethylcarbamoylmethyl)-5-phenyl-1,3-dihydro-2H - 1,4 - benzodiazepine-2-one, M.P. 178–180° C.

7-chloro - 1 - (N-methylcarbamoylmethyl)-5-(o-fluorophenyl)-1,3-dihydro-2H-1,4-benzodiazepine2-one. M.P. 212–214° C.

1-(N-methylcarbamolymethyl) 5 - phenyl-7-(2',2',2'-trifluoroethyl)-1,3-dihydro-2H-1,4 - benzodiazepine-2-one. M.P. 259–260° C.

1-(N-methylcarbamoylmethyl) - 5 - phenyl-1,3-dihydro-2H-1,4-benzodiazepine-2-one. M.P. 212–213° C.

7-chloro-1-(N-ethylcarbamoylmethyl) - 5 - phenyl-1,3-dihydro-2H-1,4-benzodiazepine-2-one. M.P. 210–212° C.

7-chloro - 1 - (N-methylcarbamoylmethyl)-5-phenyl-1,3-dihydro - 2H - 1,4 - benzodiazepine-2-one. M.P. 253–254° C.

1-carbamoylmethyl - 7 - chloro-5-phenyl-1,3-dihydro-2H-1,4-benzodiazepine-2-one. M.P. 234–235° C.

1-(2'-carbamoylethyl)-7-chloro-5-phenyl - 1,3 - dihydro-2H-1,4-benzodiazepine-2-one. M.P. 198–200° C.

7-chloro-1-(β-N-methylcarbamoylethyl) - 5 - phenyl-1,3-dihydro-2H - 1,4 - benzodiazepine-2-one. M.P. 189–190° C.

1-(N-methylcarbamoylmethyl) - 7 - nitro-5-phenyl-1,3-dihydro-2H - 1,4 - benzodiazepine-2-one. M.P. 223–225° C.

7-chloro - 5 - (o-chlorophenyl)-1-(N-methylcarbamoylmethyl)-1,3-dihydro-2H - 1,4 - benzodiazepine-2-one. M.P. 196–198° C.

1 - (N - methylcarbamoylmethyl) - 5 - phenyl-7-trifluoromethyl-1,3-dihydro-2H-1,4-benzodiazepine-2 one. M.P. 260–261° C.

What is claimed is:

1. A process for preparing benzodiazepine derivatives and acid addition salts thereof, represented by the formula,

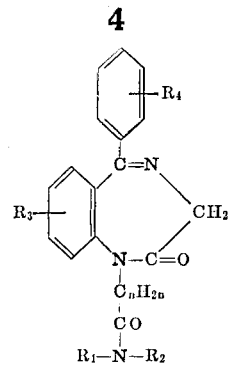

wherein $R_1$ and $R_2$ signify respectively a hydrogen atom or at lower alkyl group; $R_3$ and $R_4$ signify respectively a hydrogen atom, a halogen atom, a nitro group, a lower alkyl group or a halogenated lower alkyl group; $n$ signifies, 1, 2, or 3; which process comprises contacting a 2-aminomethyl indole derivative or acid addition salt thereof, represented by the formula,

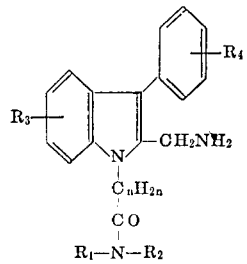

wherein $R_1$, $R_2$, $R_3$, $R_4$ and $n$ are as defined above, with at least the stoichiometric amount of an oxidizing agent selected from the group consisting of ozone, hydrogen peroxide, peracetic acid, perbenzoic acid, chromic anhydride or potassium permanganate, in the presence of a solvent.

2. A process according to claim 1, wherein the oxidizing agent is chromic anhydride and the reaction is carried out at a room temperature.

3. A process according to claim 1, wherein the solvent is acetic acid.

4. A process according to claim 1, wherein said acid in the acid addition salt of said benzodiazepine derivatives is hydrochloric acid, nitric acid, phosphoric acid, maleic acid, fumaric acid, succinic acid, formic acid or acetic acid.

5. A process according to claim 1, wherein the acid in the acid addition salt of said 2-aminomethylindole derivatives is hydrochloric acid, sulfuric acid, nitric acid or phosphoric acid.

References Cited

UNITED STATES PATENTS 3,371,085  2/1968  Reeder et al. _____ 260—239.3

HENRY R. JILES, Primary Examiner

R. T. BOND, Assistant Examiner

U.S. Cl. X.R.

260—326.14, 326.15

Disclaimer 3,555,013.—*Hisao Yamamoto*, Nishinomiya-shi, *Shigeho Inaba*, Takarazuka-shi, *Tadashi Okamoto*, Ashiya-shi, *Toshiyuki Hirohashi*, Kobe, *Kikuo Ishizumi*, Minoo-shi, *Michihiro Yamamoto*, Takarazuka-shi, *Isamu Maruyama*, Minoo-shi, *Kazuo Mori*, Kobe, *Tsuyoshi Kobayashi*, Minoo-shi, and *Takahiro Izumi*, Takarazuka-shi, Japan. PROCEDURE FOR PREPARING 1,4-BENZODIAZEPINE-2-ONE DERIVATIVES. Patent dated Jan. 12, 1971. Disclaimer filed Jan. 16, 1975, by the assignee, *Sumitomo Chemical Company, Ltd.*

Hereby enters this disclaimer to all of the claims of said patent.

[*Official Gazette March 25, 1975.*]